UNITED STATES PATENT OFFICE 2,524,528

STABILIZED CHLORINATED ESTERS OF FATTY ACIDS

Ernest W. Johnson, Mountainside, N. J., assignor to Metal & Thermit Corporation, New York, N. Y., a corporation of New Jersey No Drawing. Application October 6, 1948,
Serial No. 53,157

20 Claims. (Cl. 260—398.5)

This invention relates to the stabilization of chlorinated esters of fatty acids and comprises adding to the esters as a stabilizer up to about 5% by weight of an organo tin compound selected from the class consisting of an alkyl stannane and a derivative of said stannane selected from the class consisting of an alkyl-aryl stannane and an alkyl-acyloxy stannane.

As is known, chlorinated esters of fatty acids have a tendency to deteriorate, especially when heated, and this fact has retarded their commercial development. The tendency is manifested by a dehydrochlorination of the esters, or by a darkening of the same, or by both effects. For example, esters like methyl pentachlor stearate and methyl dichlor stearate, which are useful plasticizers or plasticizer extenders, deteriorate at relatively low temperatures, the deterioration being manifested in some cases by a darkening or discoloration effect and in other instances by the evolution of hydrogen chloride. These two forms of deterioration, namely dehydrochlorination and discoloration, are not necessarily interrelated, as it has been found that some stabilizers are more effective against one form than against the other.

By means of the present invention, deterioration of chlorinated esters of the kind described may be reduced by adding to the esters an organo tin compound chosen from the following groups: alkyl stannanes, alkyl-aryl stannanes, and alkyl-acyloxy stannanes. The last-mentioned group is sometimes referred to as alkyl tin esters of organic acids. Alkyl-aryl stannanes and alkyl-acyloxy stannanes are preferred because it has been found that these agents tend to inhibit both of the above mentioned forms of deterioration. Some examples of these preferred agents are dibutyl tin maleate, dibutyl tin bis(monobutyl maleate), dibutyldiphenyl tin, dibutyl tin dilaurate, and tributyl tin maleate. Other useful stabilizing agents are tetrabutyl tin, tetralauryl tin, etc.

The fatty acids of which the above-mentioned chlorinated esters are derivatives are a homologous series of compounds which may be broadly characterized as $CH_3(CH_2)_x COOH$, where $x$ may range from zero to upwards of 30. The lower members of the series, those for which $x$ is small, are volatile liquids and are soluble in water, the water solubility decreasing rapidly as the carbon chain is lengthened. The highest members are waxy solids. The esters of any of these acids may be chlorinated but the invention is principally directed to compounds which have a sufficiently long carbon chain such that the water solubility of the acid from which they are derived is low. The invention is not limited to esters derived from acids corresponding strictly to the type formula $CH_3(CH_2)_x COOH$, but includes esters derived from substituted acids, for example acids in which one or more of the hydrogen atoms in the $(CH_2)_x$ chain has been substituted by other elements or groups provided only that the substitutions are such that the fundamental fatty-acid character of the acid is not disturbed.

The stabilizing agents may be added to the chlorinated esters in amounts up to about 5% by weight, preferably at least 1%. The stabilizer may be mixed with the chlorinated ester in any way which will give a uniform blend, as by stirring them together cold or hot, or by dissolving them in a solvent and later evaporating the solvent.

The following examples may illustrate the invention. In Table I, methyl pentachlor stearate was heated to the temperatures indicated in a stream of dry nitrogen and the amount of hydrogen chloride gas evolved was collected and measured after the time intervals shown. In each case, also, other samples of the same amount of the ester, but containing a stabilizing agent as indicated, were heated to the same temperatures and the amount of gas evolved was measured as before. The amount of stabilizer in each case was 1% by weight.

*Table I*

| Exam. No. | Temp., °C. | Time, hrs. | HCl Gas Evolved, mg. | | | | | |
|---|---|---|---|---|---|---|---|---|
| | | | Chlorinated Ester plus: | | | | | |
| | | | No Stabilizer | $Bu_4Sn$ | $Bu_2Ph_2Sn$ | $Bu_2SnMa$ | $Bu_2Sn(BuMa)_2$ | $Bu_2SnLa_2$ |
| 1 | 140 | 1 | 2.7 | | 0 | 0 | 0 | 0 |
| 2 | 140 | 2 | 4.2 | | 0 | 0 | 0 | 0 |
| 3 | 140 | 3 | 5.4 | | 0 | 0.2 | 0.2 | 2.3 |
| 4 | 140 | 4 | 6.5 | | 0 | 5.9 | 5.9 | 4.2 |
| 5 | 160 | 2 | 92 | 2 | | | | |
| 6 | 160 | 4 | 117 | 4 | | | | |
| 7 | 160 | 6 | 135 | 6 | | | | |
| 8 | 160 | 8 | 150 | 8 | | | | |

$Bu_4Sn$ = tetrabutyl tin
$Bu_2Ph_2Sn$ = dibutyldiphenyl tin
$Bu_2SnMa$ = dibutyl tin maleate
$Bu_2Sn(BuMa)_2$ = dibutyl tin bis(monobutyl maleate)
$Bu_2SnLa_2$ = dibutyl tin dilaurate As may be seen, all of the above stabilizing agents were effective for varying periods of time to inhibit or reduce the deterioration of the ester due to dehydrochlorination.

The examples in Table II illustrate the stabilization of a chlorinated ester against discoloration. The same ester was employed as in Examples 1 to 8. In each case samples of the ester containing 1% by weight of a stabilizing agent, and a control sample, were maintained at a temperature of 140° C. for the time indicated, after which the color of the samples was measured by means of a set of Gardner Color Standard according to the procedure set forth in H. A. Gardner's "Physical and Chemical Examination of Paints, Varnishes, Lacquers, and Colors," 9th edition, page 72. As is known, in the Gardner test method progressively darker colors are indicated by progressively higher numbers, and vice versa.

*Table II*

| Exam. No. | Time, hrs. | Gardner No. Chlorinated Ester plus: | | | | | |
|---|---|---|---|---|---|---|---|
| | | No Stabilizer | $Bu_3SnMa$ | $Bu_2SnMa$ | $Bu_2Sn(BuMa)_2$ | $Bu_2Ph_2Sn$ | $Bu_2SnLa_2$ |
| 9 | ½ | 15 | | 6 | 6 | 6 | 7 |
| 10 | 1 | 15 | | 9 | 9 | 8 | 10 |
| 11 | 2 | 18 | 6 | 14 | 13 | 17 | 18 |

As is evident, all of the above stabilizing agents inhibited color formation, some being more effective than others.

The examples in Table III are similar to those of Table II, except that the concentration of the stabilizers is varied. In these cases the chlorinated ester was methyl dichlor stearate.

*Table III*

| Exam. No. | Stabilizer | Time, hrs. | Temp., °C. | Concentration, Per Cent b. w. | Gardner No. |
|---|---|---|---|---|---|
| 12 | $Bu_3SnMa$ | 1 | 160 | 0.5 | 4-5 |
| 13 | do | 1 | 160 | 0.2 | 6-7 |
| 14 | do | 1½ | 140 | 0.1 | 4 |
| 15 | do | 1½ | 140 | 0.01 | 10-11 |
| 16 | do | 2 | 140 | 0.5 | 4 |
| 17 | do | 3 | 140 | 1 | 4 |
| 18 | $Bu_2Sn(BuMa)_2$ | 1 | 160 | 0.5 | 5 |
| 19 | do | 1 | 160 | 0.1 | 10-11 |
| 20 | $Bu_2SnMa$ | 1 | 160 | 0.2 | 5 |
| 21 | do | 1 | 160 | 0.1 | 10-11 |
| 22 | do | 1½ | 140 | 0.1 | 4 |
| 23 | do | 1½ | 140 | 0.01 | 10-11 |
| 24 | do | 3 | 140 | 0.5 | 4 |
| 25 | Control | 1 | 160 | | 15 |
| 26 | do | 1½ | 140 | | 11-12 |
| 27 | do | 2 | 140 | | 11-12 |
| 28 | do | 3 | 140 | | 15 |

It will be seen that concentrations of stabilizer as low as 0.01% by weight effect a reduction of deterioration due to discoloration.

It will be appreciated that although the invention has been described in connection with more or less specific embodiments thereof, it is capable of obvious variations without departing from its scope.

In the light of the foregoing description, the following is claimed:

1. A chlorinated ester of a fatty acid stabilized with up to about 5% by weight of an organic tin compound selected from the class consisting of an alkyl stannane and a derivative of said stannane selected from the class consisting of an alkyl-aryl stannane and an alkyl-acyloxy stannane.

2. A chlorinated ester of a fatty acid stabilized with up to about 5% by weight of an alkyl stannane.

3. A chlorinated ester of a fatty acid stabilized with up to about 5% by weight of an alkyl-aryl stannane.

4. A chlorinated ester of a fatty acid stabilized with up to about 5% by weight of an alkyl-acyloxy stannane.

5. A chlorinated ester of a fatty acid stabilized with up to about 5% by weight of dibutyldiphenyl tin.

6. A chlorinated ester of a fatty acid stabilized with up to about 5% by weight of a butyl tin maleate.

7. A chlorinated ester of stearic acid stabilized with up to about 5% by weight of an organic tin compound selected from the class consisting of an alkyl stannane and a derivative of said stannane selected from the class consisting of an alkyl-aryl stannane and an alkyl-acyloxy stannane.

8. Methyl pentachlor stearate stabilized with up to about 5% by weight of an organic tin compound selected from the class consisting of an alkyl stannane and a derivative of said stannane selected from the class consisting of an alkyl-aryl stannane and an alkyl-acyloxy stannane.

9. Methyl dichlor stearate stabilized with up to about 5% by weight of an organic tin compound selected from the class consisting of an alkyl stannane and a derivative of said stannane selected from the class consisting of an alkyl-aryl stannane and an alkyl-acyloxy stannane.

10. Methyl pentachlor stearate stabilized with up to about 5% by weight of an alkyl tin maleate.

11. Methyl dichlor stearate stabilized with up to about 5% by weight of an alkyl tin maleate.

12. Methyl pentachlor stearate stabilized with up to about 5% by weight of a butyl tin maleate.

13. Methyl dichlor stearate stabilized with up to about 5% by weight of a butyl tin maleate.

14. Methyl pentachlor stearate stabilized with up to about 5% by weight of tributyl tin maleate.

15. Methyl dichlor stearate stabilized with up to about 5% by weight of tributyl tin maleate.

16. Methyl pentachlor stearate stabilized with up to about 5% by weight of dibutyl tin maleate.

17. Methyl dichlor stearate stabilized with up to about 5% by weight of dibutyl tin maleate.

18. Methyl pentachlor stearate stabilized with up to about 5% by weight of dibutyldiphenyl tin.

19. Methyl dichlor stearate stabilized with up to about 5% by weight of dibutyldiphenyl tin.

20. Method of stabilizing a chlorinated ester of a fatty acid which comprises adding to said ester up to about 5% by weight of an organic tin compound selected from the class consisting of an alkyl stannane and a derivative of said stannane selected from the class consisting of an alkyl-aryl stannane and an alkyl-acyloxy stannane.

ERNEST W. JOHNSON.

REFERENCES CITED

The following references are of record in the file of this patent:

UNITED STATES PATENTS

| Number | Name | Date |
|---|---|---|
| 2,162,255 | Heald | June 13, 1939 |